Patented Sept. 2, 1947

2,426,855

UNITED STATES PATENT OFFICE 2,426,855

ACCELERATOR OF VULCANIZATION

Adolph J. Beber, Copley, Ohio, assignor to The B. F. Goodrich Company, New York, N. Y., a corporation of New York No Drawing. Application March 10, 1945, Serial No. 582,169

14 Claims. (Cl. 260—785)

This invention relates to the vulcanization of rubber and pertains more specifically to the use of organometallic salts as vulcanization accelerators.

These organometallic salts are prepared by reacting in an acidified aqueous medium a water-soluble salt of a metal having a valence greater than one with an alkali metal salt of N-methylene dithiocarbamic acid, and an alkali metal salt of a sulfhydryl compound. The alkali metal salts of N-methylene dithiocarbamic acid are prepared by reacting equimolecular portions of formaldehyde and ammonium dithiocarbamate in an aqueous medium. The white precipitate that forms is then dissolved by the addition of an aqueous solution of an alkali metal hydroxide which forms the alkali metal N-methylene dithiocarbamate with the liberation of ammonia. These reactions probably take place according to the following equations:

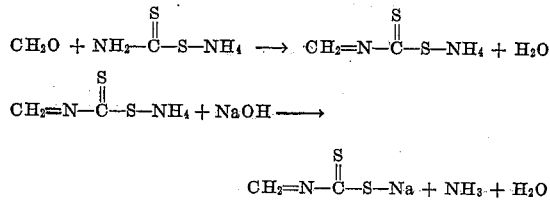

The preparation of the mixed organometallic salts of my invention is more specifically described in my copending application, Serial No. 580,725, filed March 2, 1945.

There are a great number of salts which fall within the scope of my invention, and in general, they may be represented by the following formula: A—M—B, where the metal, M, is joined to A, the acid radical of N-methylene dithiocarbamic acid, and to B, a sulfide radical derived from a sulfhydryl compound by replacing the hydrogen atom of the —SH group. The sulfhydryl compounds which are used to produce the preferred salts are thio-acids such as the dithionic, dithiocarbamic, and xanthogenic acids, and the mercaptans of the nitrogen-containing members of the heterocyclic series, such as 2-mercaptothiazoles, 2-mercaptothiazolines, 2-mercaptothiazines, 2-mercapto-oxazoles, 2-mercapto-oxazolines, mercaptoquinolines, and the like.

The metals that can be used in making these salts are any of the metals having a valence greater than one and having water-soluble salts, but the preferred organometallic salts are those containing zinc, lead, manganese, iron, and copper.

Because of the broad scope of this new class of compounds, an accelerator can be made to satisfy a desired vulcanization accelerating activity or to produce an accelerator having more desirable physical properties.

This new class of organometallic salts includes the following compounds:

—zinc N-methylene-dithiocarbamate dimethyl-dithiocarbamate

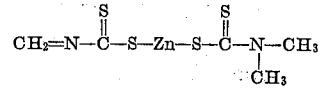

—zinc N-methylene dithiocarbamate diethyl-dithiocarbamate

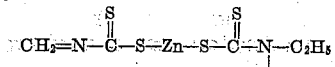

—zinc N-methylene dithiocarbamate benzothiazyl mercaptide

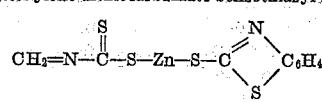

—zinc N-methylene dithiocarbamate 4,5-dimethylthiazyl mercaptide

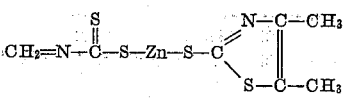

—zinc N-methylene dithiocarbamate 4-ethylthiazyl mercaptide

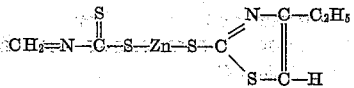

—zinc N-methylene dithiocarbamate thiazolinyl mercaptide

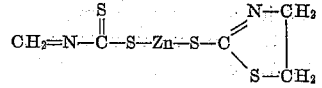

—zinc N-methylene dithiocarbamate 4,6,6'-trimethylthiazinyl mercaptide

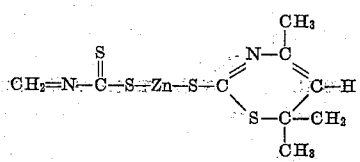

—manganous N-methylene dithiocarbamate benzothiazyl mercaptide

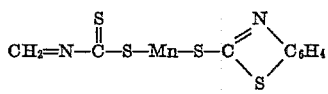

—manganous N-methylene dithiocarbamate thiazolinyl mercaptide

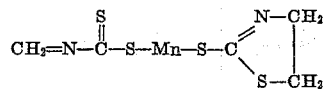

—manganous N-methylene dithiocarbamate 4,6,6'-trimethylthiaziny mercaptide

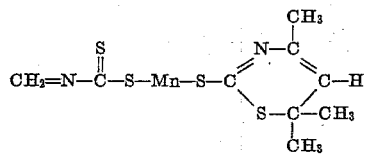

—manganous N-methylene dithiocarbamate dimethyldithiocarbamate

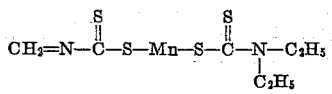

—lead N-methylene dithiocarbamate 4,5-dimethylthiazyl mercaptide

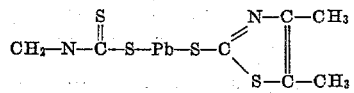

—lead N-methylene dithiocarbamate diethyldithiocarbamate

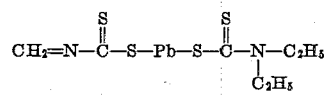

The above compounds are given as examples of this new class of organometallic compounds and are not intended as a limitation thereof.

Among the rubbers with which my new vulcanization accelerators may be used are all varieties of natural rubber, such as caoutchouc, balata, gutta percha, latex, reclaimed rubber, artificial rubber isomers and such synthetic rubber as can be vulcanized with sulfur, such as polymers of butadiene, isoprene, 2,3-dimethyl butadiene, piperylene, and the like and copolymers of these compounds with acrylonitrile, styrene, methyl acrylate, methyl methacrylate, isobutylene, and other copolymerizable monomers. As used herein, in the specification and claims, the term "a rubber" is intended to designate all the above rubbers.

These new vulcanization accelerators may be incorporated into the rubber on a roll mill or in an internal mixer or by any other suitable means. Other compounding ingredients such as any of the ordinary pigments, fillers, dyes, antioxidants, or other accelerators of vulcanization may be employed together with my new accelerators. Small quantities of these vulcanization accelerators will produce appreciable results. In general 0.1 to 5% or more, based on the rubber composition may be used, along with similar quantities of sulfur or sulfur donors, or even larger quantities if a hard vulcanized rubber is to be produced.

The following specific examples will serve more fully to illustrate my invention. Although these new compounds may be used with any of the above rubbers, the examples will only describe the use of these vulcanization accelerators in natural rubber and in the butadiene-1,3 styrene copolymer. The following compounding recipes were used throughout the following examples in which the parts are by weight:

| | Parts |
|---|---|
| Natural rubber | 100 |
| Carbon black | 51.5 |
| Stearic acid | 3.0 |
| Zinc oxide | 10.0 |
| Antioxidant | 0.75 |
| Sulfur | 3.0 |
| Accelerator | 1.0 |

| | Parts |
|---|---|
| Butadiene-1,3 styrene copolymer containing fatty acid | 100 |
| Carbon black | 50 |
| Zinc oxide | 10 |
| Antioxidant | 1.0 |
| Sulfur | 2.0 |
| Accelerator | 1.75 |

*Table I*

| N-Methylene Dithiocarbamyl Organometallic Salt Used as Vulcanization Accelerator | | Code |
|---|---|---|
| Metal | Sulfhydryl Compound | |
| Zn | 2-mercaptobenzothiazole | A |
| Zn | 2-mercapto 4,5-dimethylthiazole | B |
| Zn | 2-mercaptothiazoline | C |
| Fe (ic) | 2-mercaptobenzothiazole | D |
| Mn (ous) | 2-mercaptobenzothiazole | E |
| Mn (ous) | {2-mercapto 4,5-dimethylthiazole / 2-mercapto 4-ethylthiazole} | G |
| Zn | {2-mercapto 4,5-dimethylthiazole / 2-mercapto 4-ethylthiazole} | H |
| Pb (ous) | {2-mercapto 4,5-dimethylthiazole / 2-mercapto 4-ethylthiazole} | J |
| Zn | 2-mercapto 4-methyl 6-dimethylthiazine | K |
| Zn | dimethyldithiocarbamic acid | L |

After vulcanization at 280° F. for 45 minutes, the compositions had the physical properties shown in the following table, in which T is the ultimate tensile strength in lb./sq. in. and E is the ultimate elongation in percent.

*Table II*

| Code | Natural Rubber | | Butadiene-1,3 Styrene Coplymer | |
|---|---|---|---|---|
| | T | E | T | E |
| A | 3,500 | 580 | 1,650 | 360 |
| B | 3,175 | 510 | 1,525 | 510 |
| C | 2,950 | 540 | 1,700 | 425 |
| D | 2,700 | 420 | 1,250 | 295 |
| F | 3,050 | 455 | 1,100 | 325 |
| G | 3,500 | 535 | 1,400 | 405 |
| H | 3,000 | 510 | 1,000 | 495 |
| J | 3,350 | 550 | 1,280 | 550 |
| K | 2,450 | 530 | 500 | 500 |
| L | 2,200 | 390 | 1,150 | 220 |

The above natural rubber stock without accelerator vulcanized at 280° F. for as long as 150 minutes reaches an ultimate tensile strength of only about 1000 lb./sq. in. Any further vulcanization does not improve the physical properties but causes reversion. The above synthetic rubber stock without accelerator when vulcanized at 280° F. for as long as 3 or more hours reaches an ultimate tensile strength of only about 200 lb./sq. in.

The table below is given to show the efficacy of these vulcanization accelerators at different times of cure. The stocks were cured at 280° F. The key in Table I applies for the examples below.

Table III

| Key | Time in Min. of Vulcanization | Natural Rubber T | Natural Rubber E | Butadiene-1,3 Styrene Copolymer T | Butadiene-1,3 Styrene Copolymer E |
|---|---|---|---|---|---|
| G | 30 | 3,475 | 560 | 1,000 | 450 |
|   | 45 | 3,500 | 535 | 1,400 | 405 |
|   | 75 | 3,225 | 515 | 1,325 | 305 |
| J | 30 | 3,250 | 580 | 900 | 560 |
|   | 45 | 3,350 | 550 | 1,280 | 550 |
|   | 75 | 3,250 | 510 | 1,600 | 500 |

Other compounds of this new class are even more active accelerators of vulcanization than those given above, and, when used in the above rubber compositions in the same proportions as the above accelerators were used will cause vulcanization to take place in ⅕ to ⅓ of the above times at 280° F. The mixed salts that are most active are those that have as the B component, a sulfhydryl compound which is very active as an accelerator of vulcanization. It is evident that the activity of a sulfhydryl vulcanization accelerator may be increased by using it to produce an organometallic salt of this class. The zinc salt of the N-methylene dithiocarbamic acid radical has been tried as an accelerator of vulcanization and has proved to have little ability to accelerate the vulcanization of rubber. Attempts were made to activate some of the sulfhydryl vulcanization accelerators by incorporating the zinc salt of the N-methylene dithiocarbamic acid into a rubber composition containing the sulfhydryl compound, but the zinc N-methylene dithiocarbamate salt did not increase the activity of the accelerator. It is necessary to combine the sulfhydryl compound, the metal, and the N-methylene dithiocarbamic acid radical in a single organometallic salt to achieve the desired increased activity.

Any of the organometallic salts that come within the scope of my invention will produce results comparable with those in the above examples. The determination of the proper use of each member of this new class of vulcanization accelerators is accomplished by means well known to the art of rubber compounding.

While I have herein disclosed certain preferred manners of performing my invention, I do not thereby desire or intend to limit myself solely thereto, for, as hitherto stated, the precise proportions of the materials utilized may be varied and other members of this new class may be employed without departing from the spirit and scope of the invention as defined in the appended claims.

I claim:

1. The process which comprises vulcanizing a rubber in the presence of elemental sulfur and in the additional presence, as a vulcanization accelerator, of a mixed organometallic salt having the formula A—M—B where A is the radical

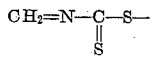

M is a bivalent metal selected from the group consisting of zinc, lead, manganese, iron, and copper; and B is a radical derived by removing hydrogen from the —SH group of a sulfhydryl compound having the —SH group attached to a carbon atom which is in turn attached by its other three valences to one atom of nitrogen and one atom of sulfur, and being otherwise composed exclusively of carbon and hydrogen atoms.

2. The process which comprises vulcanizing a rubber in the presence of elemental sulfur and in the additional presence, as a vulcanization accelerator, of a mixed organometallic salt having the formula A—M—X where A is the radical

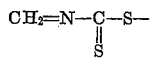

M is bivalent metal selected from the group consisting of zinc, lead, manganese, iron, and copper; and X is a dithiocarbamyl radical derived by removing hydrogen from the —SH group of a dithiocarbamic acid having the —SH group attached to a carbon atom which is in turn attached by its other three valences to one atom of sulfur by a double bond and to one atom of nitrogen by a single bond, and being otherwise composed exclusively of carbon and hydrogen atoms.

3. The process which comprises vulcanizing a rubber in the presence of elemental sulfur and in the additional presence, as a vulcanization accelerator, of a mixed organometallic salt having the formula A—M—Y where A is the radical

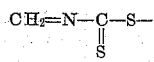

M is a bivalent metal selected from the group consisting of zinc, lead, manganese, iron, and copper; and Y is a thiazyl sulfide radical derived by removing hydrogen from the —SH group of a mercaptothiazole having the —SH group attached to the ring carbon atom which is in turn attached by a double bond to the nitrogen atom and by a single bond to the sulfur atom of the thiazole ring and being otherwise composed exclusively of carbon and hydrogen atoms.

4. The process which comprises vulcanizing a rubber in the presence of elemental sulfur and in the additional presence, as a vulcanization accelerator, of a mixed organometallic salt having the formula

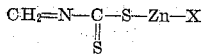

where X is a dithiocarbamyl radical derived by removing hydrogen from the —SH group of a dithiocarbamic acid having the —SH group attached to a carbon atom which is in turn attached by its other three valences to one atom of sulfur by a double bond and to one atom of nitrogen by a single bond, and otherwise being composed exclusively of carbon and hydrogen atoms.

5. The process which comprises vulcanizing a rubber in the presence of elemental sulfur and in the additional presence, as a vulcanization accelerator, of a mixed organometallic salt having the formula

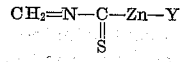

where Y is a thiazyl sulfide radical derived by removing hydrogen from the —SH group of a mercaptothiazole having the —SH group attached to the ring carbon atom which is in turn attached by a single bond to the sulfur atom and by a double bond to the nitrogen atom of the thiazole ring, and being otherwise composed exclusively of carbon and hydrogen atoms.

6. The process which comprises vulcanizing a rubber in the presence of elemental sulfur and in the additional presence, as a vulcanization accelerator, of a mixed organometallic salt having the formula

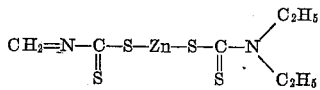

7. The process which comprises vulcanizing a rubber in the presence of elemental sulfur and in the additional presence, as a vulcanization accelerator, of a mixed organometallic salt having the formula

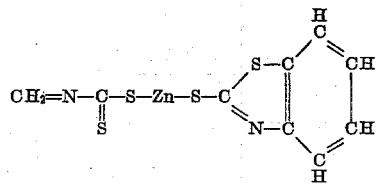

8. A rubber composition which has been vulcanized in the presence of elemental sulfur and in the additional presence, as a vulcanization accelerator, of a mixed organometallic salt having the formula A—M—B where A is the radical

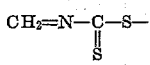

M is a bivalent metal selected from the group consisting of zinc, lead, manganese, iron, and copper; and B is a radical derived by removing hydrogen from the —SH group of a sulfhydryl compound having the —SH group attached to a carbon atom which is in turn attached by its other three valences to one atom of nitrogen and one atom of sulfur, and being otherwise composed exclusively of carbon and hydrogen atoms.

9. A rubber composition which has been vulcanized in the presence of elemental sulfur and in the additional presence, as a vulcanization accelerator, of a mixed organometallic salt having the formula A—M—X where A is the radical

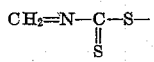

M is a bivalent metal selected from the group consisting of zinc, lead, manganese, iron, and copper; and X is a dithiocarbamyl radical derived by removing hydrogen from the —SH group of a dithiocarbamic acid having the —SH group attached to a carbon atom which is in turn attached by its other three valences to one atom of sulfur by a double bond and to one atom of nitrogen by a single bond, and being otherwise composed exclusively of carbon and hydrogen atoms.

10. A rubber composition which has been vulcanized in the presence of elemental sulfur and in the additional presence, as a vulcanization accelerator, of a mixed organometallic salt having the formula A—M—Y where A is the radical

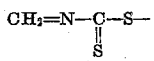

M is a bivalent metal selected from the group consisting of zinc, lead, manganese, iron, and copper; and Y is a thiazyl sulfide radical derived by removing hydrogen from the —SH group of a mercaptothiazole having the —SH group attached to the ring carbon atom which is in turn attached by a double bond to the nitrogen atom and by a single bond to the sulfur atom of the thiazole ring and being otherwise exclusively composed of carbon and hydrogen atoms.

11. A rubber composition which has been vulcanized in the presence of elemental sulfur and in the additional presence, as a vulcanization accelerator, of a mixed organometallic salt having the formula

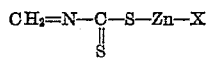

where X is a dithiocarbamyl radical derived by removing the hydrogen from the —SH group of a dithiocarbamic acid having the —SH group attached to a carbon atom which is in turn attached by its other three valences to sulfur atom by a double bond and to a nitrogen atom by a single bond, and being otherwise composed of carbon and hydrogen atoms.

12. A rubber composition which has been vulcanized in the presence of elemental sulfur and in the additional presence, as a vulcanization accelerator, of a mixed organometallic salt of the formula

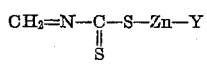

where Y is a thiazyl sulfide radical derived by removing hydrogen from the —SH group of a mercaptothiazole having the —SH group attached to the ring carbon atom which is in turn attached by a double bond to the nitrogen atom and by a single bond to the sulfur atom of the thiazole ring, and being otherwise composed exclusively of carbon and hydrogen atoms.

13. A rubber composition which has been vulcanized in the presence of elemental sulfur and in the additional presence, as a vulcanization accelerator, of a mixed organometallic salt having the formula

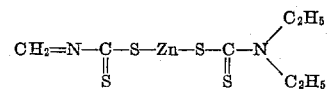

14. A rubber composition which has been vulcanized in the presence of elemental sulfur and in the additional presence, as a vulcanization accelerator, of a mixed organometallic salt having the formula

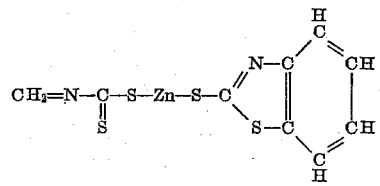

ADOLPH J. BEBER.

REFERENCES CITED

The following references are of record in the file of this patent:

UNITED STATES PATENTS

| Number | Name | Date |
|---|---|---|
| 2,102,547 | Sebrell | Dec. 14, 1937 |
| 1,892,719 | Bruni | Jan. 3, 1933 |

Certificate of Correction

Patent No. 2,426,855.  September 2, 1947.

ADOLPH J. BEBER

It is hereby certified that errors appear in the printed specification of the above numbered patent requiring correction as follows: Column 3, line 13, for that portion of the compound reading "trimethylthiaziny" read *trimethylthiazinyl*; column 4, Table I, under the heading "Code" for the letter "E" read *F*; column 6, line 8, after the word "is" insert *a*; and that the said Letters Patent should be read with these corrections therein that the same may conform to the record of the case in the Patent Office.

Signed and sealed this 4th day of May, A. D. 1948.

[SEAL]

THOMAS F. MURPHY,
*Assistant Commissioner of Patents.*